United States Patent [19]

Lee

[11] Patent Number: 5,754,257

[45] Date of Patent: May 19, 1998

[54] AUTOMATIC CHANNEL ACCORD METHOD

[75] Inventor: Teck Ho Lee, Seoul, Rep. of Korea

[73] Assignee: Samsung Electronics Co., Ltd., Kyungki-Do, Rep. of Korea

[21] Appl. No.: 718,246

[22] Filed: Sep. 20, 1996

[30] Foreign Application Priority Data

Nov. 27, 1995 [KR] Rep. of Korea ............. 95-43933

[51] Int. Cl.⁶ .................................................. H04N 5/76
[52] U.S. Cl. ........................... 348/731; 348/569; 360/69; 360/79; 455/186.1; 386/46; 386/83
[58] Field of Search ................................ 348/731, 732, 348/553, 563, 569, 570; 358/335; 360/33.1, 69, 79, 14.1; 455/186.1; 386/46, 83; H04N 5/76

[56] References Cited

U.S. PATENT DOCUMENTS

| | | | |
|---|---|---|---|
| 4,998,292 | 3/1991 | Eigeldinger et al. | 455/186 |
| 5,278,655 | 1/1994 | Jeong | 358/191.1 |
| 5,291,343 | 3/1994 | Goto | 360/33.1 |
| 5,546,193 | 8/1996 | Hailey et al. | 358/335 |
| 5,550,644 | 8/1996 | So | 358/335 |

*Primary Examiner*—Glenton B. Burgess
*Attorney, Agent, or Firm*—Sughrue, Mion, Zinn, Macpeak & Seas, PLLC

[57] ABSTRACT

An automatic channel accord method, which harmonizes first channel data corresponding to a first broadcasting reception device and second channel data corresponding to a second broadcasting reception device is provided. In the method, the first channel data is stored in the first broadcasting reception device, and the second channel data is stored in the second broadcasting reception device. Then, the first channel data is copied from the first broadcasting reception device and stored in the second broadcasting reception device as new second channel data. As a result, the new second channel data stored in the second broadcasting reception device corresponds to the first channel data stored in the first broadcasting reception device.

20 Claims, 2 Drawing Sheets

FIG. 2A

|      | TV   | VTR  |
|------|------|------|
| CH1  | SBS  | MBC  |
| CH2  | KBS2 | KBS2 |
| CH3  | KBS1 | SBS  |
| CH4  | MBC  | KBS2 |

SORT FUNCTION: <u>YES</u>   NO

FIG. 2B

SORT METHOD

1. TV CHANNEL TO VTR CHANNEL
2. VTR CHANNEL TO TV CHANNEL

SELECT:   <u>1</u>      2

FIG. 2C

|      | TV   | VTR  |
|------|------|------|
| CH1  | MBC  | MBC  |
| CH2  | KBS1 | KBS1 |
| CH3  | SBS  | SBS  |
| CH4  | KBS2 | KBS2 |

AUTOMATIC CHANNEL ACCORD METHOD

RELATED APPLICATIONS

The present application is based on Korean Patent Application Ser. No. 43933/1995 which is incorporated herein by reference for all purposes.

FIELD OF THE INVENTION

The present invention relates to an automatic channel accord method. More particularly the present invention relates to an automatic channel accord method in which channels of different broadcasting reception devices are automatically harmonized with each other.

BACKGROUND OF THE INVENTION

Generally, a broadcasting reception device such as a television ("TV") or video tape recorder ("VTR") sets frequencies at which broadcasting signals are received to various channels. For example, if a user desires to have the broadcasting reception device allocate various channels to such frequencies, the user may press a channel tuning key on an input device. As a result, the reception device sequentially searches for broadcasting signals transmitted in a predetermined range of frequencies beginning from the lowest frequency. Then, when the broadcasting reception device detects a broadcasting signal on a particular frequency, it sequentially assigns a channel number to the particular frequency.

Afterwards, when the user wishes to view a broadcasting signal transmitted on a certain frequency, the user selects the channel which corresponds to the certain frequency. Consequently, the broadcasting reception device detects such frequency, tunes to the detected frequency, and receives the appropriate broadcasting signal.

In Korea, four broadcasting stations SBS, KBS2, KBS1, and MBC are respectively assigned to four channels 6, 7, 9, and 11. Since the total number of channels is relatively small, the user can easily remember which channel corresponds to which broadcasting station.

On the other hand, Europe and other countries have many more channels than Korea, and a user in such countries may be able to select from among more than 50 broadcasting channels. Accordingly, remembering which channels correspond to which broadcasting stations is relatively difficult. As a result, many broadcasting reception devices enable users to choose which channels will correspond to which broadcasting stations so that the user can more easily remember the relationship between channel numbers and broadcasting stations.

However, in the instances in which the user can customize the allocation of broadcasting stations to various channel numbers based on his or her preferences, the same channel number of two reception devices (e.g. a TV and a VTR) may correspond to different broadcasting stations. Specifically, since the TV and VTR have separate receivers, the user may allocate the channel numbers of the TV to a first ordered series of broadcasting stations and may allocate the channel numbers of the VTR to a second ordered series of broadcasting stations. Thus, if the user desires to record a particular program, the VTR may erroneously record the wrong program if the user does not remember that the channels set by the VTR are different than the channels set by the TV.

SUMMARY OF THE INVENTION

In order to overcome the disadvantages above, one object of the present invention is to provide an automatic channel accord method which coordinates the channels of different broadcasting reception devices.

In order to accomplish the above object, an automatic channel accord method, which harmonizes first channel data corresponding to a first broadcasting reception device and second channel data corresponding to a second broadcasting device, is provided. In particular, the method comprises the steps of: storing said first channel data in said first broadcasting reception device; storing said second channel data in said broadcasting reception device; copying said first channel data from said first broadcasting reception device; and storing said first channel data in said second broadcasting reception device as new second channel data such that said new second channel data stored in said second reception device corresponds to said first channel data stored in said first reception device.

BRIEF DESCRIPTION OF THE DRAWINGS

The above objects and advantages of the present invention will become more apparent by describing in detail preferred embodiments thereof with reference to the attached drawings in which:

FIG. 2A shows an example of the content of a display when the channels of two broadcasting reception devices are not harmonized;

FIG. 2B shows an example of the content of the display when a user is prompted to select how the channels of two broadcasting reception devices are to be harmonized; and FIG. 2C shows an example of the content of the display when the channels of two broadcasting reception devices are harmonized.

DETAILED DESCRIPTION OF THE PREFERRED EMBODIMENTS

Figure 1:
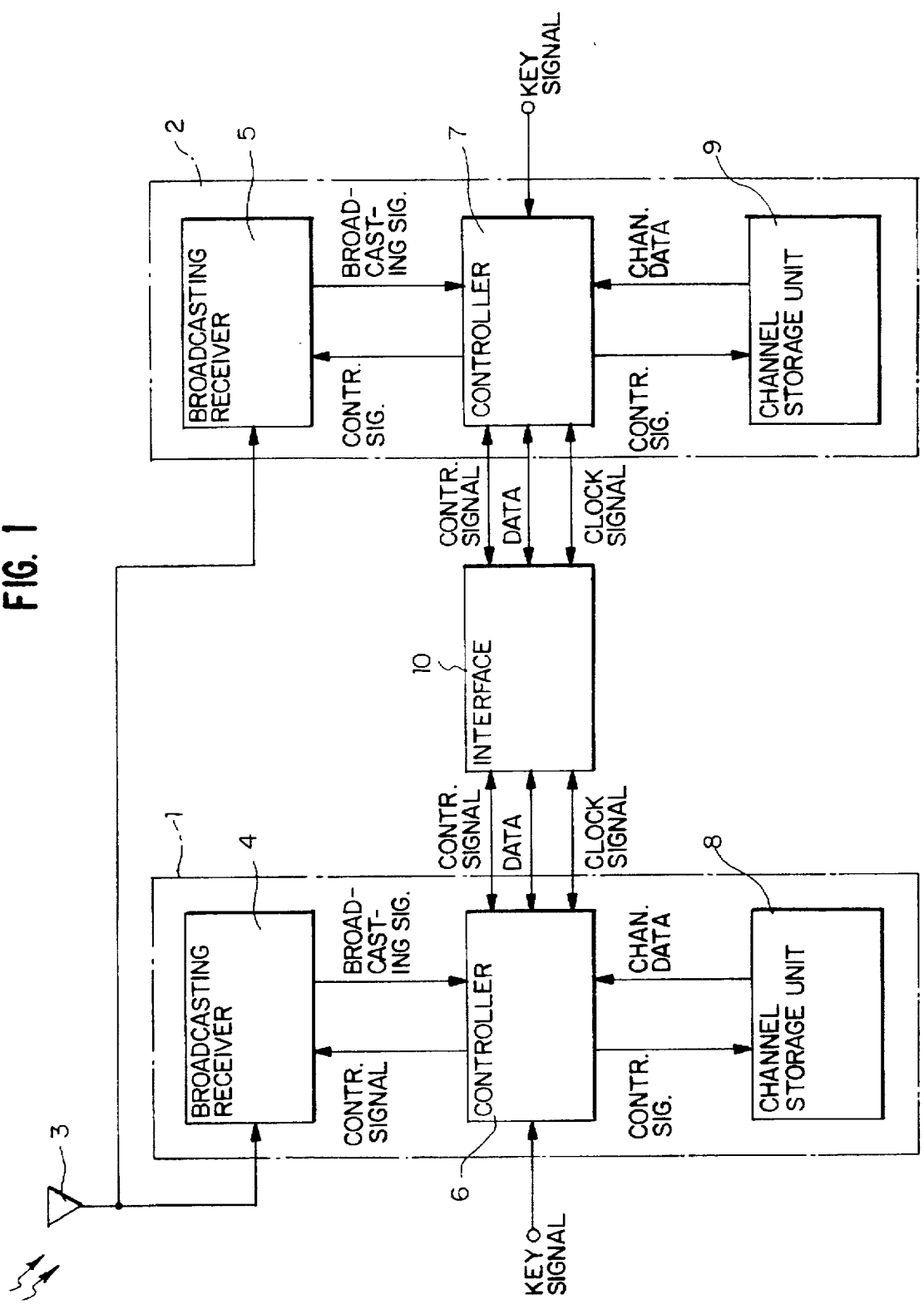
FIG. 1 is a diagram of a TV and a VTR which incorporate an embodiment of the present invention.

The following description of the preferred embodiments discloses specific configurations and components. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various features and structures of the present invention which would be known to one skilled in the art are omitted for the sake of clarity and brevity.

FIG. 1 is a diagram of a first broadcasting reception device (e.g. a television ("TV")) 1 and a second broadcasting reception device (e.g. a video tape recorder ("VTR")) 2 which incorporate an embodiment of the present invention. As shown in the figure, the TV 1 comprises a TV broadcasting receiver 4, a TV controller 6, and a TV channel storage unit 8. The receiver 4 receives broadcasting signals from an antenna 3 and outputs such signals to the controller 6, and the storage unit 8 outputs TV channel data to the controller 6. The TV channel data may correspond to the relationship among various TV channels, broadcasting stations, and/or frequencies over which broadcasting signals are transmitted by the broadcasting stations. The controller 6 inputs the channel data, as well as other data, and controls various operations of the TV 1.

Similarly, the VTR 2 comprises a VTR broadcasting receiver 5, a VTR controller 7, and a VTR channel storage unit 9. The receiver 5 inputs broadcasting signals from the antenna 3 and supplies such signals to the controller 7, and the storage unit 9 outputs VTR channel data to the controller 7. As in the case of the TV channel data, the VTR channel data relates to the relationship among various VTR channels, broadcasting stations, and/or frequencies over which broadcasting signals are transmitted by the broadcasting stations. The controller 7 inputs the VTR channel data, as well as other data, and controls various operations of the VTR 2.

In addition, the TV 1 and VTR 2 are connected together via an interface 10, and the interface 10 performs interface operations between the TV controller 6 and the VTR controller 7. The interface 10 inputs control signals, data, and clock signals from the TV 1 and outputs corresponding control signals, data, and clock signals to the VTR 2. Similarly, the interface 10 receives control signals, data, and clock signals from the VTR 2 and supplies related control signals, data, and clock signals to the TV 2. In addition, the interface 10 may be constructed from many types of components which are capable of performing the various interfacing functions.

For example, the interface 10 may be a scart jack which is generally used to form a connection between a TV and a VTR in a phase alternation line ("PAL") broadcasting reception region. The scart jack contains 21 pins, and conventionally, three of the pins (i.e. pins 10, 12, and 14) are not used. Thus, in the present embodiment, the three unused pins may be used to transmit and receive the control signals, data, and the clock signals.

The manner in which the present embodiment harmonizes the channels of the TV 1 and VTR 2 will be described below in conjunction with FIGS. 2A to 2C. However, before the channels of the TV 1 and VTR 2 are harmonized, the user must assign broadcasting stations to the channels of the TV 1 and VTR 2.

In order to assign the TV channels of the TV 1 to particular broadcasting stations, the user may input a command via an input device, and the input device may supply a corresponding TV channel setting command signal to the TV controller 6. In response to the command signal, the controller 6 outputs a searching control signal to the broadcasting receiver 4 to search for broadcasting signals within a predetermined range of frequencies beginning from the lowest frequency. As the receiver 4 receives each broadcasting signal, the user assigns the broadcasting station transmitting such signal to a particular channel by inputting an appropriate TV channel assign command via the input device. Then, the controller 6 stores the particular TV channel and broadcasting station as channel data in the channel storage unit 8. Thus, the channel data may indicate the particular channel, broadcasting station transmitting the signal, and/or the frequency over which broadcasting signal is transmitted.

Channels of the VTR 2 may be assigned to particular broadcasting stations, in a similar manner. Specifically, the user may input a command via an input device, and the input device may output a related VTR channel setting command signal to the VTR controller 7. Then, the controller 7 supplies a searching control signal to the broadcasting receiver 5 to search for broadcasting signals within a predetermined range of frequencies beginning from the lowest frequency. As the receiver 5 detects each broadcasting signal, the user assigns the broadcasting station transmitting the signal to a certain channel by inputting a VTR channel assign commands via the input device. Then, the controller 7 stores the certain VTR channel and broadcasting station as channel data in the channel storage unit 9.

Subsequently, the user can display a list of the TV and VTR channels and their respectively assigned broadcasting stations on a display (not shown). In particular, the user may input a channel display command via the input device, and the input device outputs a corresponding command to the TV controller 6. As a result, the controller 6 detects or retrieves the TV channel data stored in the channel storage unit 8.

In addition, the VTR controller 7 detects or retrieves the VTR channel data stored in the channel storage unit 9, and outputs a control signal to the interface 10 to place the interface 10 in a communication standby mode. Then, the controller 7 sequentially outputs the VTR channel data and a clock signal indicative of the starting and ending points of the VTR channel data to the interface 10. Subsequently, the interface 10 outputs a control signal to the TV controller 6 to place the controller 6 in a data reception standby mode and supplies the VTR channel data and the clock signal to the controller 6. After the TV controller 6 inputs the TV channel data and the VTR channel data, the controller 6 displays the TV and VTR channel data on a display unit (not shown) as shown in FIG. 2A.

When the TV and VTR channel data is displayed, a message is also displayed which asks the user whether or not he or she desires to harmonize the TV channels and the VTR channels. If the user inputs a command indicating that he or she would like to harmonize the channels, the controller displays a menu on the display as illustrated in FIG. 2B. In particular, the menu contains an option for sorting the TV channels in accordance with the VTR channels and contains an option for sorting the VTR channels in accordance with the TV channels.

If the user desires to sort the TV channels based on the VTR channels, the user inputs a TV channel sort command via the input device, and the TV channel data stored in the channel storage unit 8 is deleted. Then, the VTR channel data stored in the channel storage unit 9 is copied and stored in the storage unit 8. Alternatively, the VTR channel data may be copied and written over the TV channel data in the storage unit 8 without previously deleting the TV channel data. As a result, both the TV channels and the VTR channels correspond to the same broadcasting stations. Specifically, if the TV channel data and the VTR channel data are again displayed on the screen, the display would display the information shown in FIG. 2C.

On the other hand, if the user desires to sort the VTR channels in accordance with the VTR channels, the user inputs a VTR channel sort command via the input device, and the VTR channel data stored in the channel storage unit 9 is deleted. Then, the TV channel data stored in the channel storage unit 8 is copied and stored in the storage unit 9. In addition, the TV channel data may be copied and written over the VTR channel data in the storage unit 9 without previously deleting the VTR channel data. As a result, both the TV channels and the VTR channels correspond to the same broadcasting stations.

As described above, the TV channels and the VTR channels can be automatically harmonized by simply inputting a few easy commands. Thus, the user does not need to remember the relationship between the broadcasting stations and TV channel numbers stored in the TV 1 and the relationship between the broadcasting stations and the VTR channel numbers stored in the VTR 2 when the user operates the TV and VTR together. Also, since the present invention automatically harmonizes the TV channels and the VTR channels, the invention prevents the wrong program from being erroneously recorded if the user forgets the relationship of the VTR channels and the broadcasting stations.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. An automatic channel accord method, which harmonizes first channel data corresponding to a first broadcasting reception device and second channel data corresponding to a second broadcasting reception device, comprising the steps of:

storing said first channel data in said first broadcasting reception device;

storing said second channel data in said second broadcasting reception device;

copying said first channel data from said first broadcasting reception device, wherein said first channel data is copied in response to a data transfer command input by a user and wherein said data transfer command is specifically dedicated to harmonize said first channel data and said second channel data; and storing said first channel data in said second broadcasting reception device as new second channel data such that said new second channel data stored in said second broadcasting reception device corresponds to said first channel data stored in said first broadcasting reception device.

2. An automatic channel accord method as claimed in claim 1, wherein said first channel data comprises a first series of channels and a first series of broadcasting stations which respectively correspond to said first series of channels, and wherein said second channel data comprises a second series of channels and a second series of broadcasting stations which respectively correspond to said second series of channels.

3. An automatic channel accord method as claimed in claim 1, wherein said step of copying said first channel data from said first broadcasting reception device comprises the steps of:

designating said first channel data as reference channel data;

reading said first channel data from a first memory within said first broadcasting reception device; and outputting said reference channel data from said first broadcasting reception device to said second broadcasting reception device.

4. An automatic channel accord method as claimed in claim 3, wherein said step of storing said first channel data in said second broadcasting reception device comprises the steps of:

inputting said reference channel data to said second broadcasting reception device; and storing said reference channel data as said new second channel data in a second memory in said second broadcasting reception device.

5. An automatic channel accord method as claimed in claim 1, wherein said step of copying said first channel data from said first broadcasting reception device comprises the steps of:

reading said first channel data from a first memory within said first broadcasting reception device;

reading said second channel data from a second memory within said second broadcasting reception device;

displaying said first channel data and said second channel data on a display;

designating said first channel data as reference channel data; and outputting said reference channel data to said second broadcasting reception device.

6. An automatic channel accord method as claimed in claim 5, wherein said step of storing said first channel data in said second broadcasting reception device comprises the steps of:

inputting said reference channel data to said second broadcasting reception device; and storing said reference channel data as said new second channel data in a second memory in said second broadcasting reception device.

7. An automatic channel accord method as claimed in claim 6, wherein said step of designating said first channel data as reference channel data comprises the steps of:

displaying a menu having an option for selecting said first channel data as said reference channel data and having an option for selecting said second channel data as said reference channel data; and selecting said first channel data as said reference channel data.

8. An automatic channel accord method as claimed in claim 7, further comprising the step of displaying said first channel data and said new second channel data on said display.

9. An automatic channel accord method as claimed in claim 1, further comprising the step of deleting said second channel data from said second broadcasting reception device before said first channel data is stored in said broadcasting reception device as said new second channel data.

10. An automatic channel accord method, which harmonizes first channel data corresponding to a first broadcasting reception device and second channel data corresponding to a second broadcasting reception device, comprising the steps of:

storing said first channel data in said first broadcasting reception device;

storing said second channel data in said second broadcasting reception device;

reading said first channel data from a first memory within said first broadcasting reception device;

reading said second channel data from a second memory within said second broadcasting reception device;

displaying said first channel data and said second channel data on a display;

designating said first channel data as reference channel data;

outputting said reference channel data to said second broadcasting reception device; and storing said reference channel data in said second broadcasting reception device as new second channel data such that said new second channel data stored in said second broadcasting reception device corresponds to said first channel data stored in said first broadcasting reception device.

11. An automatic channel accord method as claimed in claim 10, wherein said step of storing said first channel data in said second broadcasting reception device comprises the steps of:

inputting said reference channel data to said second broadcasting reception device; and storing said reference channel data as said new second channel data in a second memory in said second broadcasting reception device.

12. An automatic channel accord method as claimed in claim 11, wherein said step of designating said first channel data as reference channel data comprises the steps of:

displaying a menu having an option for selecting said first channel data as said reference channel data and having an option for selecting said second channel data as said reference channel data; and selecting said first channel data as said reference channel data.

13. An automatic channel accord method as claimed in claim 12, further comprising the step of displaying said first channel data and said new second channel data on said display.

14. An automatic channel accord method as claimed in claim 10, wherein said first channel data comprises a first series of channels and a first series of broadcasting stations which respectively correspond to said first series of channels, and wherein said second channel data comprises a second series of channels and a second series of broadcasting stations which respectively correspond to said second series of channels.

15. An automatic channel accord method for harmonizing first channel data and second channel data, wherein said first channel data corresponds to a first broadcasting reception device and is stored in a first memory contained in said first broadcasting reception device and wherein said second channel data corresponds to a second broadcasting reception device and is stored in a second memory contained in said second broadcasting reception device, comprising the steps of:

providing a first option to a user to store said first channel data from said first memory in said second memory;

providing a second option to said user to store said second channel data from said second memory in said first memory;

receiving a selection input from said user which corresponds to one of said first option and said second option;

if said selection input corresponds to said first option, storing said first channel data in said second memory as new second channel data such that said new second channel data stored in said second memory corresponds to said first channel data stored in said first memory; and if said selection input corresponds to said second option, storing said second channel data in said first memory as new first channel data such that said new first channel data stored in said first memory corresponds to said second channel data stored in said second memory.

16. An automatic channel accord method as claimed in claim 15, wherein said first channel data comprises a first series of channels and a first series of broadcasting stations which respectively correspond to said first series of channels, wherein said second channel data comprises a second series of channels and a second series of broadcasting stations which respectively correspond to said second series of channels, and wherein said selection input from said user is received based on a response of said user to at least one of said first option and said second option being displayed in a menu on a display.

17. An automatic channel accord method as claimed in claim 15, wherein said step of providing said first option comprises the step of displaying said first option on a display, and wherein said step of providing said second option comprises the step of displaying said second option on said display.

18. An automatic channel accord method as claimed in claim 15, further comprising the steps of:

reading said first channel data from said first memory within said first broadcasting reception device before said selection input is received;

reading said second channel data from said second memory within said second broadcasting reception device before said selection input is received; and displaying said first channel data and said second channel data on a display before said selection input is received.

19. An automatic channel accord method as claimed in claim 18, further comprising the steps of:

if said selection input corresponds to said first option, displaying said first channel data and said new second channel data on said display after said selection input has been received; and if said selection input corresponds to said second option, displaying said new first channel data and said second channel data on said display after said selection input has been received.

20. An automatic channel accord method as claimed in claim 17, further comprising the steps of:

reading said first channel data from said first memory within said first broadcasting reception device before said selection input is received;

reading said second channel data from said second memory within said second broadcasting reception device before said selection input is received;

displaying said first channel data and said second channel data on a display before said selection input is received;

if said selection input corresponds to said first option, displaying said first channel data and said new second channel data on said display after said selection input has been received; and if said selection input corresponds to said second option, displaying said new first channel data and said second channel data on said display after said selection input has been received.

* * * * *